Dec. 28, 1954     H. F. KENNISON     2,698,193
PIPE SECTION
Filed Feb. 9, 1951     2 Sheets-Sheet 2

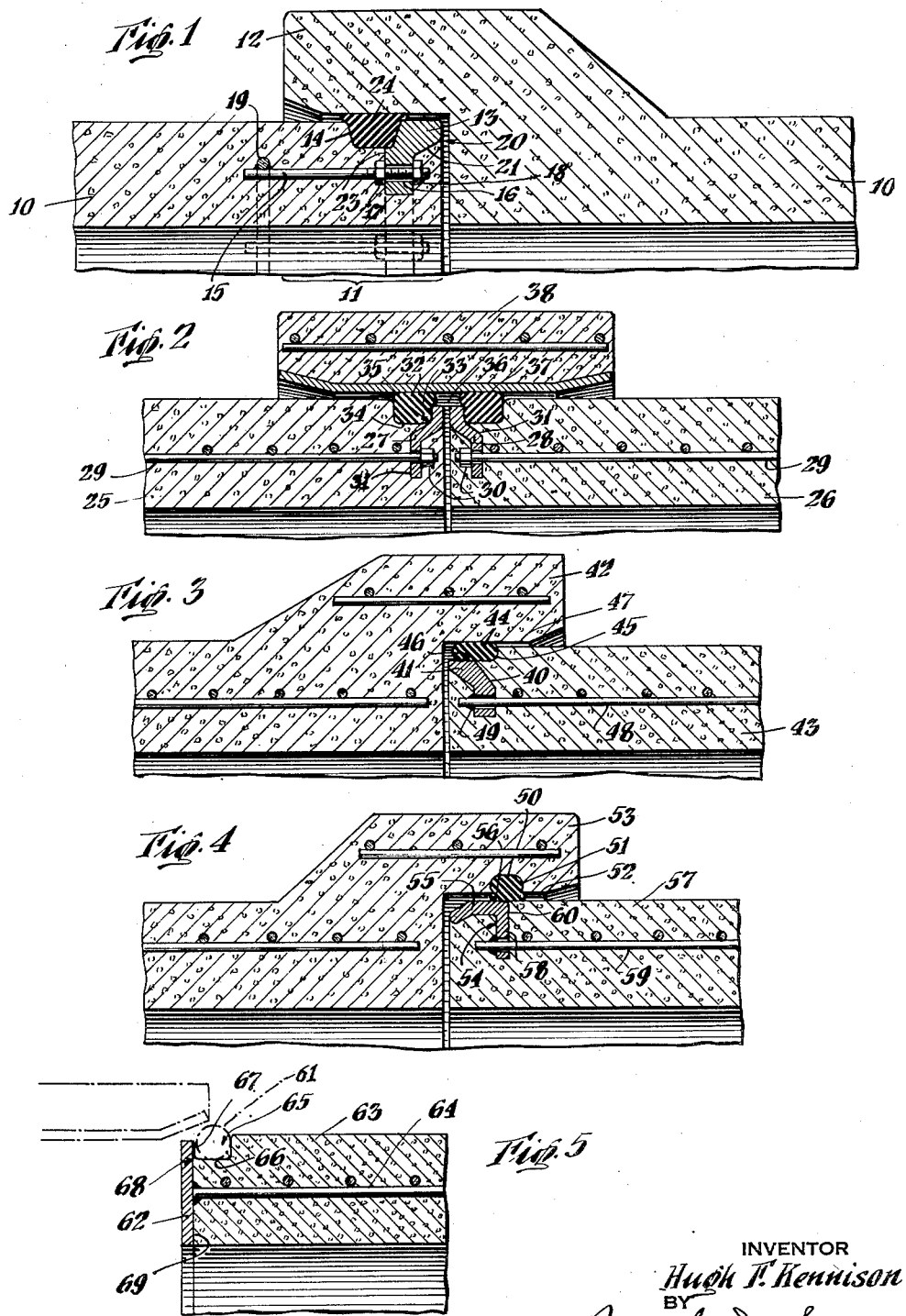

INVENTOR
Hugh F. Kennison
BY
Robert S. Dunham
ATTORNEY

United States Patent Office 2,698,193
Patented Dec. 28, 1954

2,698,193

PIPE SECTION

Hugh F. Kennison, Verona, N. J., assignor to Lock Joint Pipe Company, East Orange, N. J., a corporation of New Jersey Application February 9, 1951, Serial No. 210,196

4 Claims. (Cl. 285—112)

This invention relates to pipe sections and particularly to the construction of the spigot end of a pipe section and the preventing of leakage between a spigot joint ring and the conduit portion of a pipe section of which the joint ring is a part.

The spigot of the pipe section of the present invention is constituted of an end of a moulded conduit, which may be made of concrete or of other mouldable material, and a joint ring of a dissimilar material, such as metal, together providing surfaces for sustaining a gasket in sealing relationship to the line of division between the moulded conduit and the ring for preventing leakage from between the conduit and the ring. The gasket also serves to seal the joint between the spigot and the outer coupling member which is employed for connecting two pipe sections together.

While improved designs and methods of manufacture have produced moulded conduits which will withstand and remain tight under much higher internal pressures than formerly, little has been accomplished for preventing leakage from between the conduit and the joint rings.

Joint rings of metal serve many purposes. They provide the ends of the pipe sections with tough and resilient material which will withstand the shock of blows inevitably received during handling of the pipe section, they strengthen the joints for withstanding stresses due to internal pressure, external loads and flexing occurring at the joints, and also serve to provide a surface over which a joint-sealing gasket can slide and still remain tight.

Despite all prior efforts it has been difficult, if not impossible, to make a watertight connection between the conduit of the pipe section and the ring. The difficulty arises largely from the difference in the coefficients of expansion of the two materials and the shrinkage which occurs in the concrete or other moulded material when it hardens and cures. Due to these, as well as other factors, an actual space remains between the main body or conduit portion of the pipe section and the ring, which, though small, permits the passage of water. This fault has been present, irrespective of the manner in which the moulded conduits have been cast, and of the presence or absence of tension in the longitudinal or circumferential reinforcing of the moulded conduit. Joint rings of metal constitute an important part of a pipe section designed for carrying high pressures and the fault referred to is a serious one because the loss of water by leakage is an economic waste and seepage in more than small quantities can damage a pipe line structure.

The present invention fulfills a long existing need for obtaining watertightness at the interface between a moulded conduit and a joint ring, and is susceptible of use in a variety of forms of pipe sections of which a number have been selected for illustrative purposes.

In the drawings, Fig. 1 is a section through a bell-and-spigot type of joint employing the present invention;

Fig. 2 is a section showing a joint between coupled double-spigot pipe sections;

Fig. 3 is a section of a modified form of bell-and-spigot type of joint;

Fig. 4 is a section showing a bell-and-spigot type of joint wherein a gasket-retaining recess is located within a bell;

Figs. 5 and 6 illustrate different forms of spigots which may be used on pipe sections and in joints of the kinds illustrated in Figs. 1 and 2;

Figure 6:
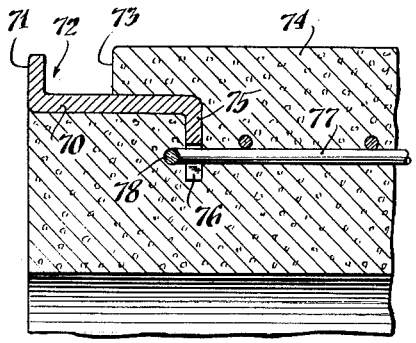

The principle of the invention is utilized in all of the various joints which are illustrated in the accompanying drawing, and it is to be understood that it is employable at both ends or at only one end of a pipe section, depending on whether a pipe section is to have two spigots or one spigot and a bell. The main body or conduit portion of a pipe section with which the invention is particularly efficacious is principally constituted of moulded material, by which is meant that the moulded material constitutes the prime barrier to the passage of water or other fluid through the wall of the conduit portion of the pipe section. The joint ring may be made of suitable metal or of other equivalent material, such as hard rubber or a hardened plastic.

A mouldable material commonly used in the manufacture of pipe sections is concrete, but other suitable materials which become hard and durable may be employed, such, for example, as several of the synthetic, organic plastics. Since pipe sections of the type to which the invention is directed are commonly made of concrete and steel, these two materials will be referred to hereinafter to simplify the description of the invention, but not by way of limitation.

Fig. 1 illustrates the application of the invention to an ordinary pipe section comprising a moulded tubular body 10 which constitutes the conduit portion of the pipe section. The spigot is that portion of a pipe section which enters into and is surrounded by an outer coupling member. As shown in Fig. 1, the spigot 11 is engaged within a bell 12 of a similar pipe section. The spigot includes a portion of the moulded conduit 10, a steel ring 13 which is located at the extreme end of the spigot, and a circumferential recess 14, which is provided by the moulded conduit and the ring 13.

In making the pipe section, the ring 13 is supported within a mould and the concrete is moulded in any manner desired. The ring is trued for roundness and finished to precise dimensions before mounting. The pipe section is complete when the concrete has hardened. Any suitable means may be employed to attach or anchor the ring in a secure position relative to the concrete, although this may be accomplished in some types of pipe sections by interlocking the concrete with the ring.

A simple manner of attaching the ring in place consists of employing a plurality of rods 15 circumferentially spaced about the ring and engaging in openings 16 in the ring. Each rod is threaded so as to permit its engagement to the ring by a pair of nuts 17, 18. The extension of the rods back from the ring may be roughened or enlarged to afford greater grip on the concrete, and the same result may be accomplished by the use of a hoop or band of metal 19 which is welded to each of the rods. As will be apparent from the following disclosure, the rods which hold the end ring in place may be tensioned if a prestressed pipe section is desired.

In prior arrangements wherein a steel ring was attached to the end of a moulded conduit, the construction was such as not to assure that leakage would not occur between the conduit and the ring. The contacting surfaces provided a possible avenue of escape of fluid, regardless of the care and skill expended in the construction of the pipe section.

In the applicant's construction the locus of entry of the water between the contacting surfaces of the concrete and ring is indicated in Fig. 1 as being at 20, which also may be considered as corresponding to the inner marginal edges of the contacting surfaces which are directly exposed to the fluid contents of a pipe line, irrespective of the form of the joint ring. In the absence of a water stop, water entering anywhere along the circle 20 would flow over the surface 21, across the inner edge of the ring 13 or through the openings 16, over the rear surface of the ring 13 and to the exterior of the pipe section. This source of leakage has been obviated by the present invention by so fabricating the spigot as to provide separate surfaces for receiving a gasket in pressing relationship against both the concrete and the ring in areas entirely surrounding the pipe section and at either side of the marginal edges of the contacting surfaces 23 at the exterior of the spigot.

As illustrated in Fig. 1, the walls of an annular recess 14 are formed in part by the concrete and in part by the ring, and the gasket 24, which is contained in the recess, overlies and is pressed against adjacent surfaces of the concrete and of the ring at either side of the marginal edges of the contacting surfaces 23 around the exterior of the spigot. In this type of joint the gasket 24 usually consists of resilient rubber or of rubber-like material which is in the form of a closed ring. When two pipe sections are to be joined, the ring is positioned within the annular recess 14. An outside coupling member consisting of a collar or a bell is pushed over the spigot. The cross-section of the gasket is such as to require its deformation for confinement within the recess. When the joint is closed, the gasket exerts a very high pressure on the confining walls of the joint and seals the joint. The concrete conduit and the spigot joint ring together provide the sustaining or bearing surfaces on the spigot against which the gasket is pressed by the outer coupling member.

A simple form of means for holding a joint ring in built-in relationship to a moulded conduit is illustrated in Fig. 1, but in types of concrete pipe sections in which the concrete is compressed longitudinally by tensioned reinforcing rods, these rods can be and are employed for fastening the spigot rings in place. Such a form of pipe section is illustrated in Fig. 2, in which the spigots 25 and 26 are adjoining ends of two similar double-spigot pipe sections. The sections are moulded, one at a time, within a mould which is so constructed as to support the spigot rings 27 and 28, one at each end of the mould. The longitudinal rods 29 are tensioned between the rings to which they are fastened by suitable means, such as the nuts 30. The concrete is poured around the steel reinforcing 29 and portions of the spigot rings 27 and 28 and embeds the same within the wall of the concrete conduit which is being formed. When the pipe section is removed from the mould, the longitudinal rods 29 continue to exert a pull on the end rings and therefore press the rings against the concrete. The pressure exerted by the rings along the abutting surfaces 31 tends to minimize separation between these surfaces, notwithstanding any shrinkage of the concrete which may have taken place.

Pipe sections in which the concrete is prestressed are usually provided for pipe lines which are intended to carry appreciable pressure. As a consequence, any contacting surfaces between the concrete and the joint ring which are subject to fluid pressure, are capable of providing an avenue of escape for the fluid, regardless of the pressure urging the two contacting surfaces together. Any fluid entering between the steel and concrete surfaces from the end of the pipe is sealed from escaping from the joint by the compressed gasket 32 which bears upon the adjacent gasket-sustaining surfaces 33 and 34 of the spigot ring and concrete, respectively, at either side of their circular marginal edges 35. The space 36 between the ends of the pipe sections is closed from the outside by the gaskets 32 and 37 which are confined within the joint by an outer coupling member or collar 38. The collar illustrated is intended to represent a conventional form of coupling collar.

The joint illustrated in Fig. 3 employs the same principle as that illustrated in Figs. 1 and 2 for preventing leakage over the embedded surface 40 of the joint ring 41. The joint between the bell 42 and the spigot 43 is sealed by a gasket 44 which is tightly pressed against the spigot surfaces 45 and 46 of concrete and steel, respectively, and the inner bearing surface 47 of the bell. The surfaces 45 and 46 constitute the wall of a recess which extends entirely around the spigot. As in the joints illustrated in Figs. 1 and 2, the gasket spans the line of meeting between the surface 40 and the gasket-sustaining surfaces 45 and 46. In this form of spigot, the exterior surface of the joint ring 41 is cylindrical and extends to the end of the pipe section. The pipe section is moulded with the steel reinforcing 48 embedded therein and attached to the joint ring 41 by welded connections 49. The longitudinal rods of the reinforcing may be pre-tensioned, if desired.

A bell-and-spigot type of connection is illustrated in Fig. 4 in which the gasket 50 is contained within an annular recess 51 in the inner surface 52 of the bell 53. The steel joint ring 54 has a flange 55 providing a surface 56, which is in juxtaposition with the surface 57 of the concrete conduit, and a flange 58 extending inwardly of the conduit. The joint ring 54 is attached to the steel reinforcing 59 of the pipe section by connection with the flange 58. The contacting surfaces 60 between the spigot ring and the concrete are sealed within the joint by the gasket 50 which is pressed against adjacent portions of the surfaces 56 and 57 of the joint ring and concrete conduit, respectively.

In the form of spigot illustrated in Fig. 5, the joint ring 62 contacts with and abuts the entire end surface of the concrete conduit 63 and it is held in place by the pretensioned longitudinal rods 64 which are welded to the joint ring. The circumferential recess 65 is formed in part by concrete and in part by the joint ring which have adjacent surfaces 66 and 67 meeting in a circular line at 68. Leakage between the abutting surfaces 69 of the steel and concrete is prevented when a gasket 61 is pressed against the surfaces 66 and 67.

The spigot as shown in Fig. 6 has a joint ring of Z-form in cross-section. The web 70 and the end flange 71 provide the bottom and one of the side walls of the gasket-receiving recess 72, and the surface 73 of the concrete conduit 74 provides the other side wall of the recess. The annular meeting line of the wall 73 with the web 70 is sealed by a gasket contained within the recess in a closed joint. A flange 75 has a number of slots 76 for receiving the ends of the longitudinal reinforcing members 77 which have hooks 78 for engaging with the flange.

Figure 7:
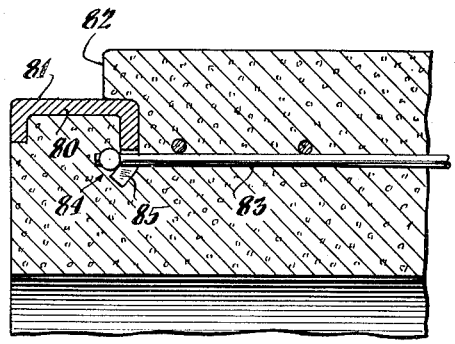
Fig. 7 is a modified form of the spigot of the type illustrated in Fig. 3.

The spigot illustrated in Fig. 7 is a modification of the spigot illustrated in Fig. 3. The steel joint ring 80 has a substantially U-shape cross-section, the exterior of the web providing a cylindrical sustaining surface 81 for a gasket. The gasket, when contained within a closed joint, bears upon the surface 81, the end surface 82 of the conduit, and the interior bearing surface of the joint-enclosing collar or bell. Flow from along the embedded surfaces of the joint ring is thereby prevented. Each longitudinal member of the reinforcing 83 is attached to the spigot joint ring 80 by an upset 84 which engages lips at either side of a slot 85.

Figure 8:
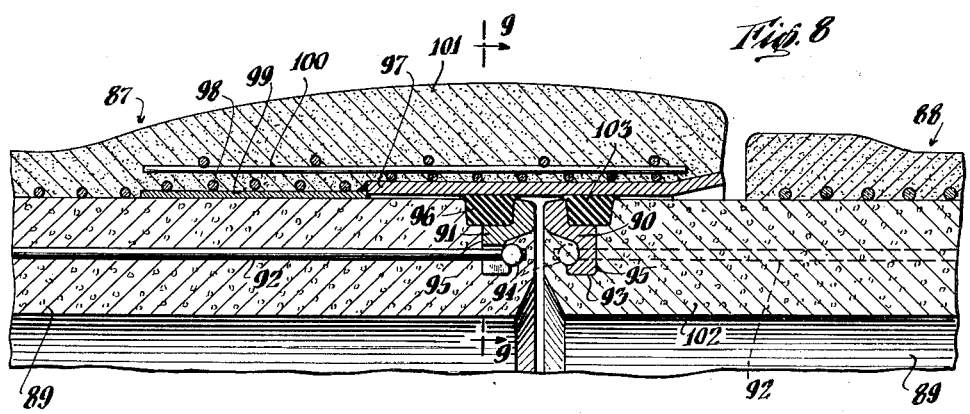
Fig. 8 is a longitudinal section of a joint for a form of high pressure concrete pipe.
Figure 9:
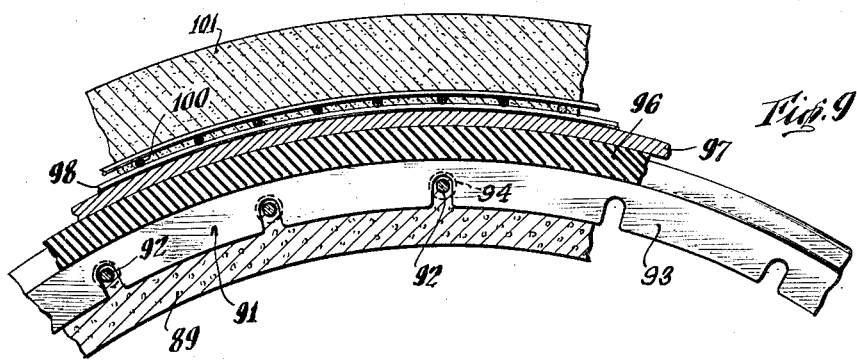
Fig. 9 is a section on line 9—9 of Fig. 8.

In Figs. 8 and 9 there is illustrated a joint between a bell and a spigot of similar pipe sections 87 and 88 which are so constructed as to withstand very high internal fluid pressure. Each pipe section has a monolithic concrete conduit 89 in which a steel ring is partially embedded at each end. The two rings 90, 91, are formed similarly to the joint ring 13, Fig. 1, but the ring 90 serves as a spigot joint ring and the other ring 91 is located within a bell. The present invention is utilized at both ends of the conduit portion of this type of pipe section for preventing loss of fluid by escape along the embedded surfaces of the rings.

When a conduit portion 89 is cast, preferably in a centrifuging machine, a pair of rings 90 and 91 are held in place within the mould and a plurality of wires 92 are stressed and hooked over the flanges 93 of the joint rings. The flanges are radially slotted to provide for the passage of the wires therethrough. The wires are upset at their ends to thereby provide enlargements 94 to seat within a circumferential recess adjacent the serrated flange 93. The annular gasket-receiving recesses are formed in part by the rings and in part by the concrete. The tension in the wires has the effect of retaining the contacting surfaces 95 between the rings and the concrete in close-fitting relationship, and the concrete in compression after the pipe section is removed from the mould.

In constructing the bell, a resilient rubber gasket 96 is placed within the gasket-receiving recess at one end of the conduit, and a steel collar 97 is forced over the gasket. Leakage along the inner surface of the collar 97 and along the contacting surfaces 95 between the concrete and the steel ring, is prevented by the gasket. The steel collar 97 forms the inner surface of the bell of the pipe.

The collar 97 is seized in position upon the concrete conduit by a highly tensioned wrapping of wire 98 which is helically wound around the conduit and over one or more relatively flexible plates 99, which are welded to the collar 97, and over the collar to which the end of the wire is attached. This wire places the conduit under circumferential compression and thereby additionally increases the strength of the pipe section. The outside of the conduit, the wire, and any other reinforcing, such as the mesh 100, is covered by a coating 101 of mortar.

As can be understood from Fig. 8, a joint between connected pipe sections of this type is closed when the spigot 102 of a pipe section on which a gasket 103 has been placed is introduced within the bell of another pipe section. The gasket is held in the recess on the spigot and prevents leakage over the end of the spigot to the outside of the joint. The same gasket prevents leakage over the embedded surface of the spigot ring 90 by sealing the abutting surfaces between the ring and the concrete lengthwise of the gasket-containing recess, in the same manner as described hereinabove with reference to the construction illustrated in Fig. 1.

The principle of the invention has been described in connection with its application to a number of forms of pipe sections, and it is to be understood that it may be embodied in other constructions, and that some of the various features and elements in the combinations and relations described may be altered, and others omitted without interfering with the usefulness of the invention and the scope of the appended claims.

What is claimed is:

1. A pipe section comprising a concrete conduit portion with one end thereof constituting part of the spigot of said pipe section and a metal ring constituting another part of said spigot, the metal ring being located adjacent the free end of the spigot and exposed around the outer periphery of said spigot, said metal ring and the concrete of said conduit portion having contacting surfaces extending transversely of the wall of said spigot, means attaching together said metal ring and said concrete conduit portion as fixed integral parts of the whole pipe section, said concrete conduit portion and said metal ring together providing gasket-sustaining surfaces forming an annular recess intersected by said contacting surfaces in a circle around said spigot at the side of said ring facing away from the free end of the spigot, whereby a gasket disposed in said recess engages said gasket-sustaining surfaces at both sides of said circle and prevents leakage through the wall of the spigot from over said side of said metal ring between said metal ring and the concrete of said conduit portion.

2. A pipe section comprising a concrete conduit portion with one end thereof constituting part of the spigot of said pipe section and a metal ring constituting another part of said spigot, the metal ring being partially embedded in the concrete of said conduit portion and having a portion thereof located adjacent the free end of said spigot and exposed around the outer periphery of said spigot, said metal ring and the concrete of said conduit portion having contacting surfaces forming an interface extending laterally of said pipe section within the wall of said spigot, said interface comprising a surface of said ring facing away from the free end of said spigot and an oppositely facing surface of the concrete, and means permanently connecting together said metal ring and said conduit portion, said metal ring and the concrete of said conduit portion adjacent said ring each providing a portion of an annular gasket-receiving recess in the outer surface of said spigot which is formed to one side of said interface by the concrete of said conduit portion and to the other side of said interface by the metal ring.

3. A pipe section comprising a concrete conduit portion with one end thereof constituting part of the spigot of said pipe section and a metal ring constituting another part of said spigot, the metal ring being partially embedded in the concrete of said conduit portion and having an outer portion located adjacent the free end of said spigot and exposed around the outer periphery of said spigot, said metal ring having a surface facing away from the free end of said spigot and the concrete of said conduit portion having an oppositely facing surface, said surfaces extending laterally of said pipe section and contacting one another, prestressed members extending longitudinally in the wall of said conduit portion and attached to said metal ring, said prestressed members maintaining said conduit portion in compression and said metal ring pressed against said conduit portion at said contacting surfaces, said contacting surfaces forming an interface extending to the outer surface of said spigot and to the inner edge of the embedded portion of said metal ring, said outer portion of said metal ring and the concrete part of said spigot each providing an annular portion of a gasket-receiving recess in the outer surface of said spigot which is formed to one side of said interface by the concrete of said conduit portion and to the other side of said interface by the metal ring.

4. A pipe section comprising a concrete conduit portion with one end thereof constituting part of the spigot of said pipe section and a metal ring constituting another part of said spigot, the metal ring having an outer portion exposed adjacent the end of the spigot and around the outer periphery of said spigot, and a flange portion displaced from the free end of the spigot and extending radially inward of said outer portion, said flange portion of said metal ring and the concrete of said conduit portion having, respectively, a surface on said flange portion facing away from the free end of said spigot and an oppositely facing surface of the concrete forcibly pressed on one another in abutting relationship by tensioned members fast in said conduit portion and attached to said flange portion, said abutting surfaces forming an interface extending to the outer surface of said spigot, said exposed outer portion of said metal ring and the concrete of said conduit portion adjacent said ring together providing adjacent gasket-sustaining surfaces around said spigot, whereby a gasket located on said gasket-sustaining surfaces overlies the outer marginal edges of said abutting surfaces between said flange portion and the concrete of said conduit portion.

References Cited in the file of this patent

UNITED STATES PATENTS

| Number | Name | Date |
|---|---|---|
| 1,976,589 | Trickey | Oct. 9, 1934 |
| 2,158,829 | Miller | May 16, 1939 |
| 2,265,328 | Trickey | Dec. 9, 1941 |
| 2,488,245 | Smith | Nov. 15, 1949 |

FOREIGN PATENTS

| Number | Country | Date |
|---|---|---|
| 840,751 | France | Jan. 23, 1939 |